(12) United States Patent
Weyerhaeuser et al.

(10) Patent No.: US 8,694,508 B2
(45) Date of Patent: Apr. 8, 2014

(54) COLUMNWISE STORAGE OF POINT DATA

(75) Inventors: Christoph Weyerhaeuser, Heidelberg (DE); Tobias Mindnich, Walldorf (DE); Daniel Baeumges, Viersen (DE); Gerrit Simon Kazmaier, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/488,143

(22) Filed: Jun. 4, 2012

(65) Prior Publication Data

US 2013/0325874 A1 Dec. 5, 2013

(51) Int. Cl.
*G06F 7/00* (2006.01)
*G06F 17/30* (2006.01)

(52) U.S. Cl.
USPC ............................................................ 707/743

(58) Field of Classification Search
USPC ......... 705/7.14, 321; 707/694, 743, 765, 766, 707/781; 709/223, 224; 714/4.11, 6.3, 748
See application file for complete search history.

(56) References Cited

U.S. PATENT DOCUMENTS

| 8,204,313 | B2* | 6/2012 | Wheeler et al. | 382/195 |
| 2007/0112714 | A1* | 5/2007 | Fairweather | 706/46 |
| 2007/0288196 | A1* | 12/2007 | Frank et al. | 702/151 |
| 2009/0060345 | A1* | 3/2009 | Wheeler et al. | 382/195 |
| 2009/0227269 | A1* | 9/2009 | Frank et al. | 455/456.3 |
| 2009/0251472 | A1* | 10/2009 | Antoine | 345/502 |
| 2010/0114905 | A1* | 5/2010 | Slavik et al. | 707/743 |
| 2010/0114941 | A1* | 5/2010 | Von Kaenel et al. | 707/769 |
| 2010/0318929 | A1* | 12/2010 | Hilton et al. | 715/769 |
| 2010/0332210 | A1* | 12/2010 | Birdwell et al. | 703/22 |
| 2010/0332468 | A1* | 12/2010 | Cantrell | 707/724 |
| 2011/0202539 | A1* | 8/2011 | Salemann | 707/741 |
| 2011/0276592 | A1* | 11/2011 | Gautama et al. | 707/769 |
| 2012/0191723 | A1* | 7/2012 | Salemann | 707/741 |

* cited by examiner

*Primary Examiner* — Robert Beausoliel, Jr.
*Assistant Examiner* — Nicholas Allen
(74) *Attorney, Agent, or Firm* — Mintz, Levin, Cohn, Ferris, Glovsky and Popeo, P.C.

(57) ABSTRACT

A database query of point data among two or more axes of a database is received. The database stores point data in distinct integer vectors with a shared dictionary. Thereafter, the dictionary is scanned to determine boundaries for each axis specified by the query. In response, results characterizing data responsive to the query within the determined boundaries for each axis are returned. Related apparatus, systems, techniques and articles are also described.

20 Claims, 5 Drawing Sheets

400

DICTIONARY 400A

| Value | Id |
|-------|----|
| 1.0   | 0  |
| 2.0   | 1  |
| 4.0   | 2  |
| 5.0   | 3  |
| 5.5   | 4  |

VECTOR 400B

| X | Y | Z |
|---|---|---|
| 0 | 2 | 2 |
| 1 | 1 | 1 |
| 2 | 2 | 2 |
| 4 | 2 | 3 |

FIG. 4

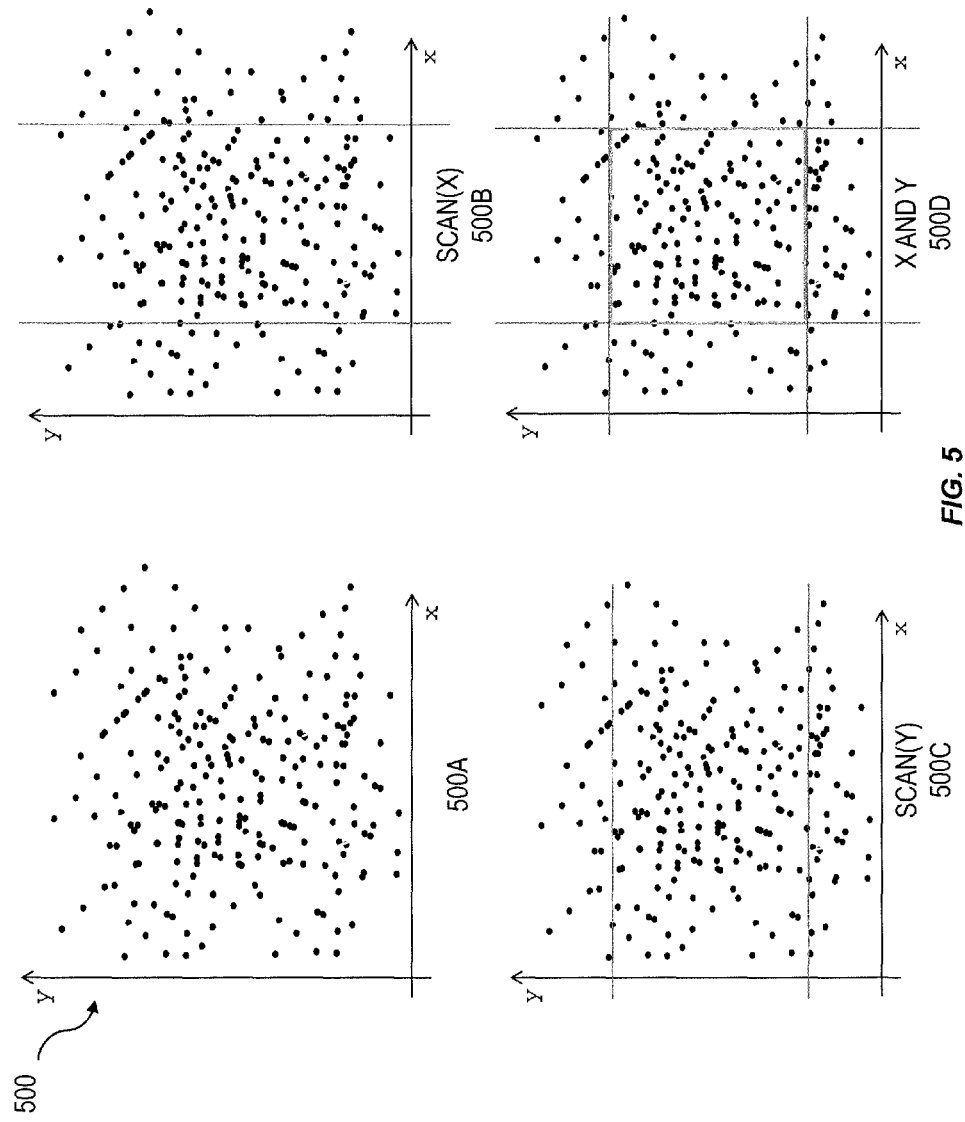

US 8,694,508 B2

COLUMNWISE STORAGE OF POINT DATA

TECHNICAL FIELD

The current subject matter is directed to columnwise storage of point data in a data source such as a column oriented database.

BACKGROUND

Geographic information systems (GIS), sometimes referred to as spatial information systems (SIS), are specialized information systems to capture, modeling, storage, retrieval, sharing, manipulation, analysis and presentation of spatial data. The main entities are spatial objects. The spatial component may embody both geometry (location, shape etc.) and topology (spatial relationships such as adjacency). The special traits of a geometric object differs significantly from any standard type, such as integers and strings. A window query, for example, searches for all points that are contained in a given rectangle. In classical database systems, special spatial access structures are used to reduce disc access and the evaluation of spatial query predicates. However, complex data structures as well as spatial indexes can consume significant processing resources as they are constructed and additionally when queried.

SUMMARY

A database query of point data among two or more axes of a database is received. The database stores point data in distinct integer vectors with a shared dictionary. Thereafter, the dictionary is scanned to determine boundaries for each axis specified by the query. In response, results characterizing data responsive to the query within the determined boundaries for each axis are returned.

The database can be a column oriented database storing data in a columnwise manner. The database can be an in-memory database.

A bit vector can be generated for each vector that identifies all points within the corresponding boundaries. These bit vectors can be merged to generate a query window that can be used to identify results responsive to the query.

The point data can characterize geometric attributes of data such as one or more of location when data was acquired and shape of acquired data. The point data can alternatively or additionally characterize topology attributes of data. Topology attributes include, for example, spatial adjacency in relation to other data points.

Non-transitory computer program products are also described that store instructions, which when executed, cause one or more data processors across one or more computing systems to implement various operations described herein. Similarly, computer systems are also described that may include at least one data processor and a memory coupled to the at least one data processor. The memory may temporarily or permanently store one or more programs that cause the at least one data processor to perform one or more of the operations described herein. In addition, operations specified by methods can be implemented by one or more data processors either within a single computing system or distributed among two or more computing systems.

The subject matter described herein provides many advantages. For example, the current subject matter provides a columnwise in-memory database that substantially alleviates the need for index structures. As a result, the current subject matter enables a new approach for storing and accessing spatial data that eliminates the need for complex spatial data structures as well as spatial indexes. In particular, the current subject matter is advantageous in that it enables efficient storage by harnessing integer and dictionary compression and efficient access by way of hardware scans.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 4 is a diagram illustrating a dictionary representation and a vector representation; and FIG. 5 are diagrams showing a sequence of scans.

DETAILED DESCRIPTION

Figure 1:
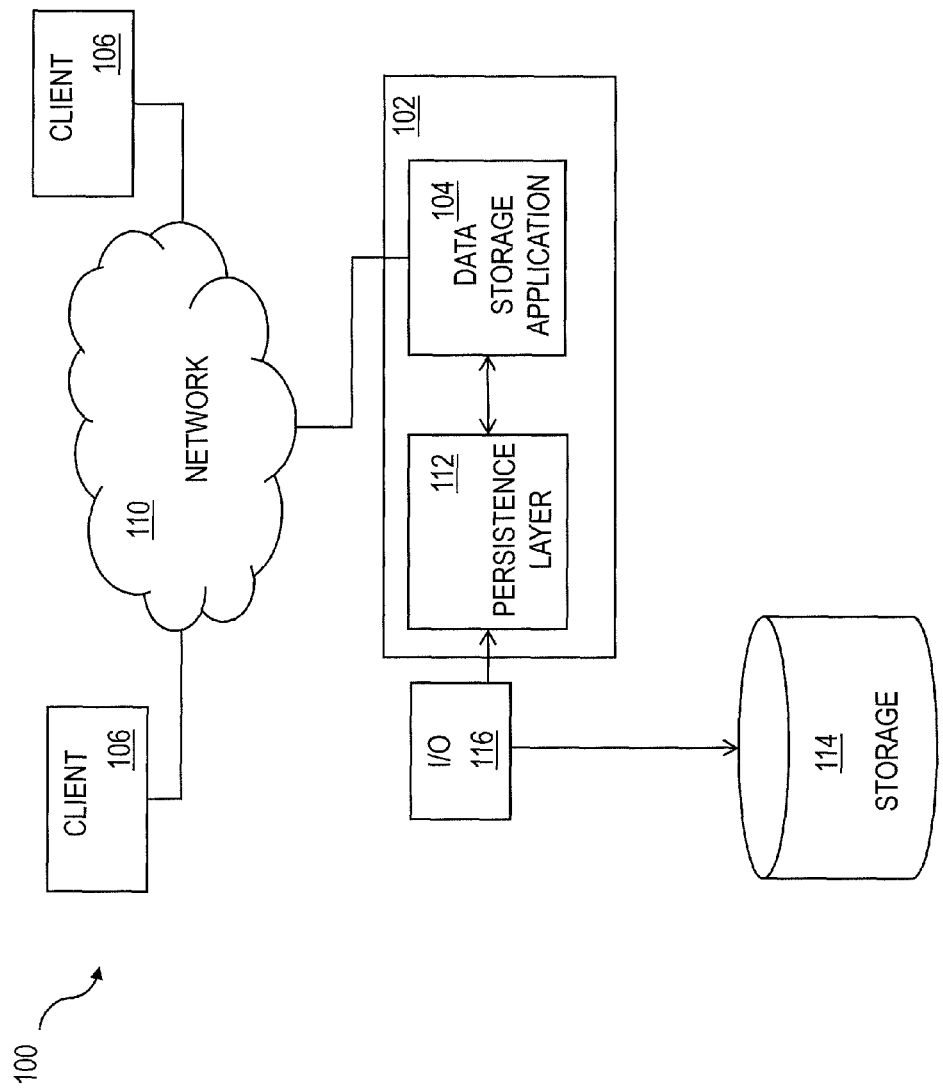
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
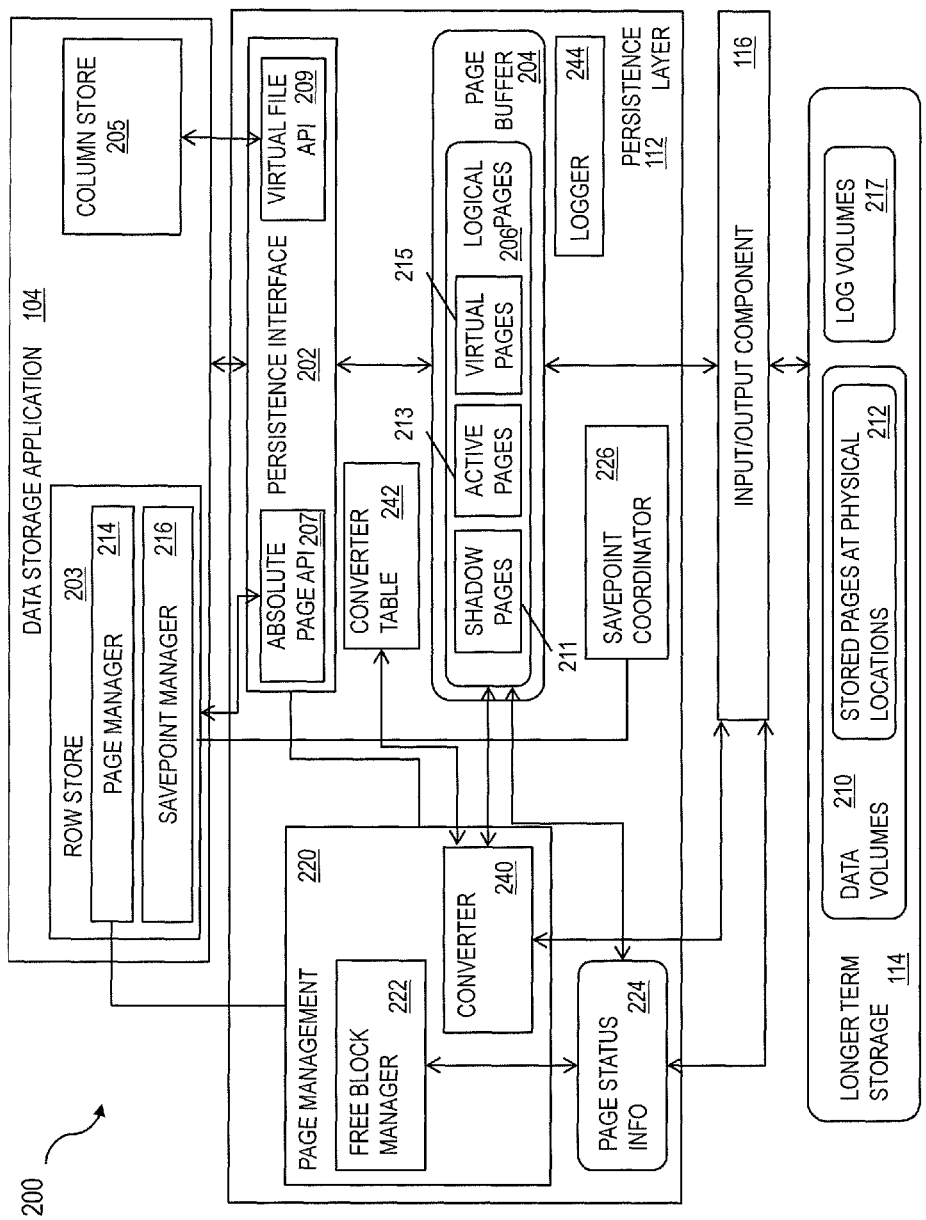
FIG. 2 is a diagram illustrating details of the system of FIG. 1.

FIG. 2 shows a software architecture 200 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 202. A page buffer 204 within the persistence layer 112 can store one or more logical pages 206, and optionally can include shadow pages 211, active pages 213, data pages of virtual files 215 (i.e., a data objects acting like a file) and the like. The logical pages 206 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 210 where stored pages 212 are allocated at physical memory blocks.

In some implementations, the data storage application 104 can include a row store 203 and a column store 205. The row store 203 can comprise or be otherwise in communication with a page manager 214 and/or a savepoint manager 216. The page manager 214 can communicate with a page management module 220 at the persistence layer 112 that can include a free block manager 222 that monitors page status information 224, for example the status of physical pages within the storage 114 and logical pages in the persistence layer 112 (and optionally in the page buffer 204). The savepoint manager 216 can communicate with a savepoint coordinator 226 at the persistence layer 204 to handle savepoints, which are used to create a consistent persistent state of the database for restart after a possible crash. The row store 203 can access the persistence interface 202 via an absolute page API 207. The column store 205 which can store columns in contiguous memory can access the persistence interface 202 via a virtual file API 209.

In some implementations of a data storage application 104, the page management module of the persistence layer 112 can implement shadow paging. The free block manager 222 within the page management module 220 can maintain the status of physical pages. The page buffer 204 can included a fixed page status buffer that operates as discussed herein. A converter component 240, which can be part of or in communication with the page management module 220, can be responsible for mapping between logical and physical pages written to the storage 114. The converter 240 can maintain the current mapping of logical pages to the corresponding physical pages in a converter table 242. The converter 240 can maintain a current mapping of logical pages 206 to the corresponding physical pages in one or more converter tables 242. When a logical page 206 is read from storage 114, the storage page to be loaded can be looked up from the one or more converter tables 242 using the converter 240. When a logical page is written to storage 114 the first time after a savepoint, a new free physical page is assigned to the logical page. The free block manager 222 marks the new physical page as "used" and the new mapping is stored in the one or more converter tables 242.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 244 can also be included to store the changes made to the data of the data storage application in a linear log. The logger component 244 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 244 whenever a change is made. This information can be written to disk at latest when the transaction ends. The log entries can be persisted in separate log volumes 217 while normal data is written to data volumes 210. With a redo log, committed changes can be restored even if the corresponding data pages were not written to disk. For undoing uncommitted changes, the persistence layer 112 can use a combination of undo log entries (from one or more logs) and shadow paging.

The persistence interface 202 can handle read and write requests of stores (e.g., in-memory stores, etc.). The persistence interface 202 can also provide write methods for writing data both with logging and without logging. If the logged write operations are used, the persistence interface 202 invokes the logger 244. In addition, the logger 244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 244. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 244 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

The column store 205 can persist its tables to virtual files provided by the persistence layer 112 via the virtual file API 207. Internally the persistence layer 112 can map a virtual file to a chain of linked pages 215 stored in the page buffer 204. Data belonging to one columnar table can be stored in multiple virtual files: one virtual file per column for a main storage and one virtual file for a delta log. In addition, one virtual file can optionally be stored per column for the main storage of the history part of the table, and/or one virtual file can optionally be stored per table for the delta of the history part of the table. The persistence layer 112 can maintain a directory that stores for each virtual file the start page and additional information such as the size and the type of the virtual file.

Figure 3:
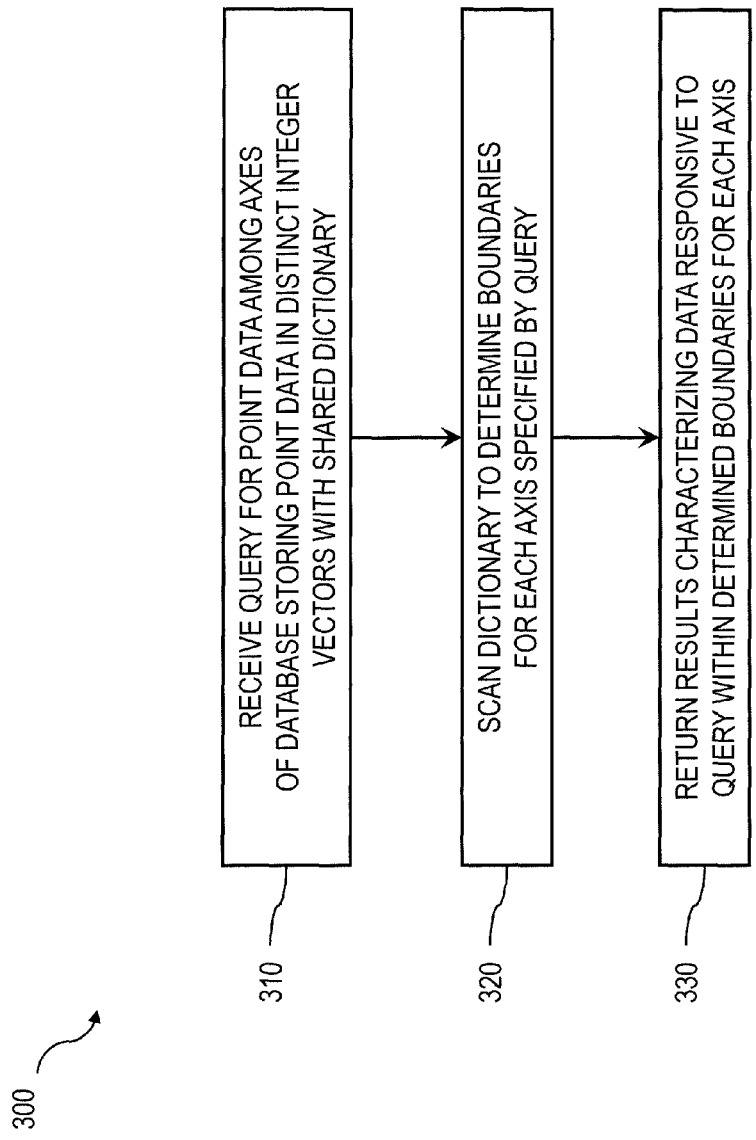
FIG. 3 is a process flow diagram illustrating returning results of a point query.

FIG. 3 is a process flow diagram 300 in which, at 310, a database query is received of point data among two or more axes. In this implementation, the database stores point data in distinct integer vectors with a shared dictionary. Subsequently, at 320, the dictionary is scanned to determine boundaries for each axis specified by the query. Results are then returned, at 330, that characterize data responsive to the query within the determined boundaries for each axis.

The data storage application 104 can utilize an attribute type that stores point data P (X, Y, Z) in distinct integer index vectors with a single shared dictionary. Each coordinate can be stored individually in the same order as they have been inserted (e.g., in a columnwise manner, etc.). The values of all coordinates can be compressed with integer compression and stored in a shared dictionary. In this regard, the dictionary can be used to provide dictionary-based compression by using the dictionary to reduce an amount of data stored in a table by representing values in the table with identifiers that may take up less memory. In general, the dictionary is a list, which can be sorted, of values appearing in a column and identifiers of the values (i.e., the value identifiers). As an example, to reduce the memory or disk space occupied by a column from a data table by means of dictionary-based compression, a sorted list of different values appearing in a column can be generated and the different values can be numbered. The numbers (implemented, for example, as integers rather than strings that may represent the values themselves) can be used as placeholders for the values in the tables where the values appeared.

FIG. 4 is a diagram 400 that illustrates a dictionary representation (400A) and a vector point representation (400B) for a set of points POINT(1.0 4.0 4.0), POINT(2.0 2.0 2.0), POINT(4.0 4.0 4.0), POINT(5.5 4.0 5.0). The physical representation of FIG. 4 differs fundamentally from classical storage of point data. Classical spatial access methods and spatial structures attempt to: (i) create memory locality, by means of storing points which are adjacent in space adjacent in memory, and (ii) prune away as much as possible entities in a search. Both concepts are violated with this approach, as no concern is given to space locality and no pruning is done when searching. This yields the benefit that no efforts are required to maintain a spatial index structure and no limitations are imposed with regards to dimensionality. All axes can be considered in parallel which enables a scan on all point coordinates; many classic approaches limited scans on two dimensions in order to use a two dimensional index structure.

The access to the points is the window query—a query that returns all points that are contained in a given rectangle. It acts as the basic operation for higher level geometric queries such as k-nearest neighbour and spatial aggregation. In contrast to an index-based spatial access method, the current subject matter performs a full scan on all axes in parallel.

FIG. 5 is a diagram 500 including 500A-D showing a sequence of scans on the X/Y axes. First, a scan can be performed on the dictionary which contains the sorted values for all axes and returns the lower and upper bound of value IDs. This scan can be done in parallel for every requested axis. Furthermore, the search for the lower and upper boundaries can be done in parallel. Second, after the boundary values have been determined, a bit vector can be created for all points that contain a 1 for all points that are contained by the boundary and a 0 for all other points. Third, after all axes completed their search, the returned bit vectors can be merged into the final result by applying using a logical AND operation. The final result contains only the points that are contained in the lower and upper boundary of all axes and hence represent the requested window (i.e., the points can form the window query). This window can be used to provide results responsive to a query (either directly or indirectly after further processing and/or filtering, etc.).

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer-implemented method comprising:
   receiving a database query of point data among two or more axes of a database, the database storing point data in distinct integer vectors with a shared dictionary, wherein coordinates for the point data are stored individually in an order in which they have been inserted into the database;
   scanning the dictionary to determine boundaries for each axis specified by the query, wherein at least a portion fo the scanning for each axis is performed in parallel; and
   returning results characterizing data responsive to the query within the determined boundaries for each axis.

2. A method as in claim 1, wherein the database is a column oriented database storing data in a columnwise manner.

3. A method as in claim 2, wherein the database is an in-memory database.

4. A method as in claim 1, further comprising:
   generating, for each axis, a bit vector identifying all points within the corresponding boundaries; and
   merging all of the bit vectors to generate a query window, the query window being used to identify results responsive to the query.

5. A method as in claim 1, wherein the point data characterizes geometric attributes of data.

6. A method as in claim 5, wherein the geometric attributes comprise one or more of location when data was acquired or shape of acquired data.

7. A method as in claim 1, wherein the point data characterizes topology attributes of data.

8. A method as in claim 7, wherein the topology attributes characterize spatial adjacency in relation to other data points.

9. A method as in claim 1, wherein the receiving, scanning, and returning are performed by at least one data processor forming part of at least one computing system.

10. A non-transitory computer program product storing instructions, which when executed by at least one data processor of at least one computing system, result in operations comprising:
    receiving a database query of point data among two or more axes of a database, the database storing point data in distinct integer vectors with a shared dictionary, the dictionary provide dictionary-based compression, wherein coordinates for the point data are stored individually in an order in which they have been inserted into the database;
    scanning the dictionary to determine boundaries for each axis specified by the query, wherein at least a portion fo the scanning for each axis is performed in parallel; and
    returning results characterizing data responsive to the query within the determined boundaries for each axis.

11. A computer program product as in claim 10, wherein the database is a column oriented database storing data in a columnwise manner.

12. A computer program product as in claim 11, wherein the database is an in-memory database.

13. A computer program product as in claim 10, wherein the operations further comprise:
    generating, for each axis, a bit vector identifying all points within the corresponding boundaries; and
    merging all of the bit vectors to generate a query window, the query window being used to identify results responsive to the query.

14. A computer program product as in claim 10, wherein the point data characterizes geometric attributes of data.

15. A computer program product as in claim 14, wherein the geometric attributes comprise one or more of location when data was acquired or shape of acquired data.

16. A computer program product as in claim 10, wherein the point data characterizes topology attributes of data.

17. A computer program product as in claim 16, wherein the topology attributes characterize spatial adjacency in relation to other data points.

18. A system comprising:
    a column-oriented in-memory database storing data columnwise, the stored data comprising coordinates that are stored in an order corresponding to when they were inserted into the in-memory database;
    one or more data processors;
    memory storing instructions, which when executed, cause at least one data processor to perform operations comprising:
    receiving a database query of point data among two or more axes, the database storing point data in distinct integer vectors with a shared dictionary;
    scanning the dictionary to determine boundaries for each axis specified by the query; and
    returning results characterizing data responsive to the query within the determined boundaries for each axis.

19. A system as in claim 18, wherein the operations further comprise:
    generating, for each axis, a bit vector identifying all points within the corresponding boundaries; and
    merging all of the bit vectors to generate a query window, the query window being used to identify results responsive to the query.

20. A system as in claim 18, wherein the point data characterizes geometric attributes of data that comprise one or more of location when data was acquired or shape of acquired data.

* * * * *

UNITED STATES PATENT AND TRADEMARK OFFICE
CERTIFICATE OF CORRECTION

| | | |
|---|---|---|
| PATENT NO. | : 8,694,508 B2 | Page 1 of 1 |
| APPLICATION NO. | : 13/488143 | |
| DATED | : April 8, 2014 | |
| INVENTOR(S) | : Christoph Weyerhaeuser et al. | |

It is certified that error appears in the above-identified patent and that said Letters Patent is hereby corrected as shown below:

In the Claims:

Column 7, line number 45, "wherein at least a portion fo" should be "wherein at least a portion of"

Column 8, line number 17, "wherein at least a portion fo" should be "wherein at least a portion of"

Signed and Sealed this
Second Day of September, 2014

Michelle K. Lee
*Deputy Director of the United States Patent and Trademark Office*